United States Patent
Furihata et al.

(10) Patent No.: US 10,878,384 B2
(45) Date of Patent: Dec. 29, 2020

(54) DEVICE MAINTAINER, A DEVICE MAINTENANCE SYSTEM, A DEVICE MAINTENANCE METHOD, A DEVICE MAINTENANCE PROGRAM AND A RECORDING MEDIUM

(71) Applicant: Yokogawa Electric Corporation, Tokyo (JP)

(72) Inventors: Ryouhei Furihata, Tokyo (JP); Yusuke Yokota, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 18 days.

(21) Appl. No.: 15/451,688

(22) Filed: Mar. 7, 2017

(65) Prior Publication Data
US 2017/0262816 A1    Sep. 14, 2017

(30) Foreign Application Priority Data
Mar. 9, 2016    (JP) ................. 2016-046114

(51) Int. Cl.
*G06Q 10/06*    (2012.01)
*G06Q 10/00*    (2012.01)

(52) U.S. Cl.
CPC ............ *G06Q 10/20* (2013.01); *G06Q 10/06* (2013.01)

(58) Field of Classification Search
None
See application file for complete search history.

(56) References Cited

U.S. PATENT DOCUMENTS

2008/0050280 A1*  2/2008  Fujita .............. G01N 35/00584
                                                  422/67
2008/0279048 A1*  11/2008 Wakamiya ....... G01N 35/00663
                                                  368/10
(Continued)

FOREIGN PATENT DOCUMENTS

CN    104811570 A    7/2015
CN    105160467 A    12/2015
(Continued)

OTHER PUBLICATIONS

Isao, H. et al, "FieldMate Field Device Management Tool for the New Era", Yokogawa Technical Report English Edition, No. 44, Dec. 31, 2007, pp. 9-12 (4 pages total).

*Primary Examiner* — Justin S Lee
(74) *Attorney, Agent, or Firm* — Sughrue Mion, PLLC

(57) ABSTRACT

The present invention relates to a device maintainer, a device maintenance system, a device maintenance method, a device maintenance program, and a recording medium, which are capable of supporting an accurate operation and improving an operation efficiency in the maintenance operation of the device or a recording operation of the maintenance result. A device maintainer having a maintenance information display for displaying maintenance information regarding a maintenance of a device; a list display for displaying a maintenance list listing a maintenance item for the device to be a maintenance target together with the displayed maintenance information and enabling designation of the maintenance item; and a maintainer for performing the maintenance based on the designated maintenance item for the device to be the maintenance target.

22 Claims, 10 Drawing Sheets

(56) References Cited

U.S. PATENT DOCUMENTS

| | | | |
|---|---|---|---|
| 2010/0057512 A1* | 3/2010 | Tays | G06Q 10/06 705/7.15 |
| 2011/0270773 A1* | 11/2011 | Siekman | G06Q 10/10 705/305 |
| 2012/0072814 A1* | 3/2012 | Czebiniak | G06F 11/26 715/201 |
| 2013/0311243 A1* | 11/2013 | Taki | G01N 35/00623 705/7.38 |
| 2014/0201839 A1* | 7/2014 | Sutherland | H04L 63/20 726/24 |
| 2014/0239171 A1* | 8/2014 | Platt | H01J 49/26 250/282 |
| 2015/0160816 A1* | 6/2015 | Furihata | G06F 3/0482 715/736 |
| 2015/0212853 A1* | 7/2015 | Makino | G06F 11/30 718/103 |
| 2015/0212854 A1 | 7/2015 | Tsukuda | |
| 2015/0222674 A1* | 8/2015 | Jinguu | H04L 65/403 709/204 |
| 2015/0293134 A1* | 10/2015 | Matsumoto | G01N 35/00623 422/67 |
| 2015/0339868 A1* | 11/2015 | Okuda | G01D 7/04 701/29.1 |
| 2016/0019212 A1* | 1/2016 | Soldani | G06F 17/30047 345/633 |
| 2016/0026374 A1* | 1/2016 | Schulz | G06F 3/04847 715/212 |
| 2016/0078147 A1* | 3/2016 | Tokuda | G06Q 10/20 715/234 |
| 2016/0292627 A1* | 10/2016 | Yamada | G06Q 10/08 |
| 2017/0061359 A1* | 3/2017 | Bullock | G06Q 10/063114 |

FOREIGN PATENT DOCUMENTS

| | | | |
|---|---|---|---|
| CN | 105179134 A | 12/2015 | |
| EP | 2881815 A2 | 6/2015 | |
| EP | 2905663 A1 | 8/2015 | |
| JP | 2002-132838 A | 5/2002 | |
| JP | 2003067519 A | 3/2003 | |
| JP | 2003216696 A | 7/2003 | |
| JP | 2013015899 A | 1/2013 | |
| JP | 2015-109011 A | 6/2015 | |
| WO | WO-2015111342 A1 * | 7/2015 | G06Q 10/08 |

* cited by examiner

FIG. 4

| ToDo LIST | | | | |
|---|---|---|---|---|
| ID | | OPERATION TARGET | TYPE | ITEM/RESULT |
| 1 | ○ | TAG1 | INPUT DEVICE | ~~LOOP CHECK~~/ZERO POINT ADJUSTMENT |
| 2 | □ | TAG2 | OUTPUT DEVICE | STROKE TEST |
| 3 | ○ | TAG3 | INPUT DEVICE | RANGE CHANGE |
| 4 | ▭ | FACILITY 1 | FACILITY | ABNORMAL NOISE CONFORMATION |
| 5 | △ | LOOP CHECK | OPERATION | ~~TAG4/TAG5/TAG6~~ |

1021 1022 1023 1024 1025  OUTPUT

| INPUT OF THE OPERATION TARGET | |
|---|---|
| No | OPERATION TARGET |
| 1 | TAG001 |
| 2 | TAG002 |
| 3 | TAG003 |
| 4 | FACILITY 1 |
| 5 | |
| 6 | |

OK  Cancel

FIG. 7

| DEVICE TAG | DEVICE ID | ADDRESS |
|---|---|---|
| TAG001 | 10123 | 1 |
| TAG002 | 10345 | 2 |
| TAG003 | 20567 | 3 |
| TAG004 | 20789 | 4 |
| ... | ... | ... |

| No. | LOCAL | | | TERMINAL BOARD | | CABLE | IO MODULE | | | STN | NOTE |
|---|---|---|---|---|---|---|---|---|---|---|---|
| | TAG NAME | TERMINAL | CABLE | No. | TERMINAL | | NUMBER | KIND | TERMINAL | | |
| 1 | TAG1 | 1 | CVV(S) | 101 | 1 | CVV(S) | 1 | AI | 1 | FCN01 | |
| | | 2 | | | 2 | | 2 | | 2 | | |
| 2 | TAG2 | 1 | CVV(S) | | 3 | | 3 | AO | 1 | | |
| | | 2 | | | 4 | | 4 | | 2 | | |
| 3 | TAG3 | 1 | CVV(S) | | 5 | | 5 | AI | 1 | | |
| | | 2 | | | 6 | | 6 | | 2 | | |
| 4 | | | | | | | | | | | SPARE |
| 5 | | | | | | | | | | | SPARE |

| OPERATION TARGET | MAINTENANCE ITEM | RESULT | COMPLETION TIME |
|---|---|---|---|
| TAG1 | LOOP CHECK | OK | 2016/02/01 10:10 |
| TAG1 | ZERO POINT ADJUSTMENT | NG | 2016/02/01 10:15 |
| TAG2 | STROKE TEST | NOT OPERATED | |
| TAG3 | RANGE CHANGE | NOT OPERATED | |

DEVICE MAINTAINER, A DEVICE MAINTENANCE SYSTEM, A DEVICE MAINTENANCE METHOD, A DEVICE MAINTENANCE PROGRAM AND A RECORDING MEDIUM

BACKGROUND OF THE INVENTION

Field of the Invention

The embodiments of the present invention relates to a device maintainer, a device maintenance system, a device maintenance method, a device maintenance program, and a recording medium.

Priority is claimed on Japanese Patent Application No. 2016-046114, filed on Mar. 9, 2016, the contents of which are incorporated herein by reference.

Description of Related Art

In the prior art, it has been used for fielders such as a measurer or an operator and a Distributed Control System (DCS) in which a controller for controlling the devices is connected via a communicator has been established, and an advanced automatic operation has been realized in an industrial plant such as chemistry, a plant that manages and controls a well such as a gas field and an oil well and surroundings, a plant that manages and controls a power generator such as a hydropower generator, a thermal power generator and a nuclear power generator, another plant that manages an environmental power generator such as a sunlight power generator and a wind power generator, and another plant and factory (hereinafter referred to as "plant") such as a plant for managing and controlling such as a water supply and drain, and a dam etc. In the plant in which such the DCS is constructed, a maintenance of the fielder (hereinafter referred to as "device" according to an occasion) by an operator is performed periodically or irregularly from the viewpoints of prevention of an abnormal operation and such as the maintenance of measurement accuracy.

The fielder is maintained, for example, by using a device maintainer capable of a wired communication or a wireless communication with the fielder. The device maintainer may be, for example, a notebook type computer, a tablet type computer, a PDA (Personal Digital Assistant), and/or a smartphone in which a dedicated program for maintaining the fielders is installed. The maintenance item of the fielder includes, for example, a confirmation operation of reading out and confirming the contents of the device information (parameter) which is set in the field device to be a maintenance target, a setting operation of setting new device information to the field device to be the maintenance target, and various maintenance operations corresponding to field devices to be the maintenance target. Further, the maintenance item includes a visual check to check a corrosion of a pipe of a facility, an audible check to check the rotation noise of the motor of the facility, and an olfactory check to check a pump of a liquid or gas from the pipe of the facility and a tank, etc. A check result may be recorded in the device maintainer.

For example, Patent Reference 1 (Japanese Patent Application Publication No. 2015-109011) discloses a technology in which the device maintainer is connected with the fielder via the wired communication or the wireless communication, and displays a list of the fielders on a display screen. The field operator sequentially carries out the maintenance operation of the fielder displayed on the display screen while checking the maintenance list (also referred to as "ToDo list") listed in correspondence with the fielder to be the maintenance target and the maintenance item to be executed for the fielder. The maintenance list is generated by using a program for generating a table or a program for generating a document, and is displayed on such as the notebook type PC as data of a program for generating the table, or is printed on a paper. The field operator sequentially records the result of performing the maintenance comparing with the maintenance list.

However, if there are a large number of the fielders to be the maintenance target in the plant, or there are a large number of the fielders of which the models are mutually different, the field operator needs to perform the maintenance operation based on the maintenance items corresponding to the various fielders, and the frequency of the maintenance operation also increases. Therefore, the field operator must generate a ToDo list having another fielder to be the maintenance target and the maintenance item every operating the maintenance operations, and enter the maintenance items respectively corresponding to the fielder to be the maintenance target. Further, when generating the maintenance list, the field operator makes it easier to erroneously write a tag and an ID that identify the fielder to be the maintenance target and the maintenance item for the fielder. Thus, an operation efficiency often deteriorates in a recording operation of the maintenance result by the field operator.

The field operator must connect the fielder with the device maintainer, execute the maintenance operation by operating the device maintainer and setting the maintenance item while checking the maintenance item entered in the maintenance list. Further, the field operator must check the fielder by visual inspection, and record the result of the maintenance operation while checking the maintenance item entered in the maintenance list. Thus, the operation efficiency of the maintenance operation often decreases. Also, when the field operator performs the above operation while checking the maintenance list, there was a case such as an incorrect connection, a misconfiguration, a missing implementation of the maintenance item, and an erroneous filling in a maintenance record, etc. caused by erroneous confirmation of the maintenance list by field operator.

The present invention relates to a device maintainer, a device maintenance system, a device maintenance method, a device maintenance program, and a recording medium, which are capable of supporting an accurate operation and improving an operation efficiency in the maintenance operation of the device or a recording operation of the maintenance result.

SUMMARY

In one embodiment, a device maintainer includes, but is not limited to, a maintenance information display, a list display, and a maintenance executer. The device maintainer includes: the maintenance information display for displaying maintenance information regarding a maintenance of a device; the list display for displaying a maintenance list listing a maintenance item for the device to be a maintenance target together with the displayed maintenance information and enabling designation of the maintenance item; and the maintainer for performing the maintenance based on the designated maintenance item for the device to be the maintenance target.

In another embodiment of the device maintainer, the list display changes a display mode of the maintenance item of which the maintenance is executed to display the maintenance list.

In another embodiment of the device maintainer, the list display displays the plural maintenance items to be enabling designation.

In another embodiment of the device maintainer, the list display displays the maintenance list including the plural maintenance items regarding the operation target and enabling designation the maintenance item from among the plural maintenance items.

In another embodiment of the device maintainer, the list display displays an operator for outputting a result of the executed maintenance.

In another embodiment, the device maintainer further includes a list generator for generating the maintenance list; wherein the list display is configured to display the generated maintenance list.

In another embodiment, the device maintainer further includes a maintenance information acquirer for acquiring the maintenance information; wherein the list generator is configured to generate the maintenance list based on the acquired maintenance information.

In another embodiment of the device maintainer, the maintenance information acquirer acquires the result of the executed maintenance as the maintenance information.

In another embodiment of the device maintainer, the list generator generates the maintenance list including the plural maintenance items regarding the operation target.

In one embodiment, a device maintenance system includes, but is not limited to, a device maintainer and an external device. The device maintainer includes, but is not limited to, a device maintainer; and an external device for being communicably connected with the device maintainer, wherein the external device further includes a list generator for generating the maintenance list, and the device maintainer includes a maintenance information display for displaying maintenance information regarding a maintenance of a device, a list display for displaying a maintenance list listing a maintenance item for the device to be a maintenance target together with the displayed maintenance information and enabling designation of the maintenance item, a maintenance list acquirer for acquiring the generated maintenance list in the external device, and a maintainer for performing the maintenance based on the designated maintenance item for the device to be the maintenance target.

In another embodiment, a device maintenance method is a method to be performed by a device maintainer. The device maintenance method includes, but is not limited to, the following processes: generating a maintenance list listing a maintenance item regarding a device to be a maintenance target; displaying maintenance information regarding a maintenance of the device; displaying the generated maintenance list together with the displayed maintenance information and enabling designation of the maintenance item; and executing the maintenance based on the maintenance item designated for the device to be the maintenance target.

In one embodiment, a programmed computer causes, but is not limited to, display maintenance information regarding a maintenance of a device; and display a maintenance list listing a maintenance item for the maintenance to be a maintenance target together with the displayed maintenance information and enabling designation of the maintenance item.

In one embodiment, a non-transitory computer readable storage medium that stores a computer program for causing, when executed by a computer, the computer to perform: displaying maintenance information regarding a maintenance of a device; and displaying a maintenance list for designating a maintenance item for the device which is a maintenance target together with the displayed maintenance information.

According to the present invention, it is possible to provide the device maintainer, the device maintenance system, the device maintenance method, the device maintenance program, and the recording medium, which may support the accurate operation and improve the operation efficiency.

BRIEF DESCRIPTION OF THE DRAWINGS

FIG. 4 is a diagram showing an example of details of the ToDo list displayed by the device maintainer according to the present embodiment of the invention.

FIG. 5 is a diagram showing an example of a screen for generating the ToDo list by a manual input displayed by the device maintainer according to the present embodiment of the invention.

FIG. 7 is a diagram showing an example of device information acquired by the device maintainer when generating the ToDo list according to the present embodiment of the invention.

FIG. 8 is a diagram showing an example of a cable connection diagram acquired by the device maintainer when generating the ToDo list according to the present embodiment of the invention.

DETAILED DESCRIPTION OF THE EMBODIMENTS

A device maintainer, a device maintenance system, a device maintenance method, a device maintenance program, and a recording medium in one embodiment of the present invention will be described in detail below with reference to the drawings.

Figure 1:
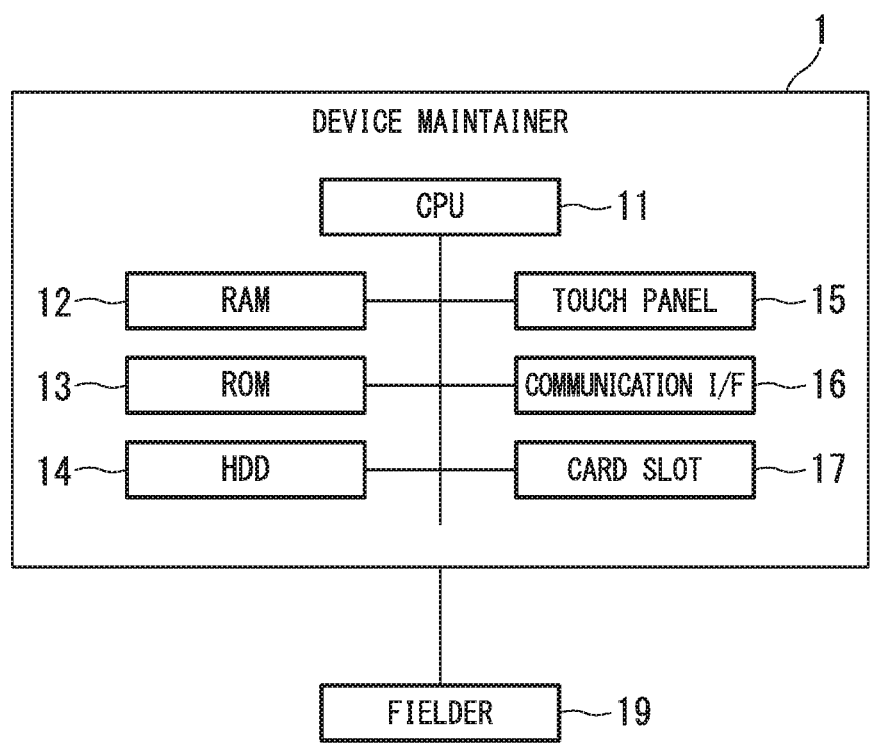
FIG. 1 is a block diagram showing an example of a hardware configuration of a device maintainer in a present embodiment of the invention.

A hardware configuration of the device maintainer will be described with reference to FIG. 1. FIG. 1 is a block diagram showing an example of the hardware configuration of the device maintainer 1 in the present embodiment.

In FIG. 1, a device maintainer 1 may include a CPU (Central Processing Unit) 11, a RAM (Random Access Memory) 12, a ROM (Read Only Memory) 13, a HDD (Hard Disk Drive) 14, a touch panel 15, a communication I/F 16, and a card slot 17. The device maintainer 1 may be communicably connected with the fielder 19.

The device maintainer 1 may include a general-purpose device such as a laptop PC, a tablet PC, a PDA, or a smartphone, or a device dedicated to the device maintenance. It may also be another device including a device maintenance functions. The device maintainer 1 may include the device maintenance program for maintaining the fielder and may support a maintenance operation of the fielder by executing the device maintenance program. The device maintainer 1 may be carried in a plant by the field operator implementing the maintenance operation, and operated by the field operator.

The CPU 11 may execute a program stored in the RAM 12, the ROM 13 or the HDD 14, and control the device maintainer 1. The device maintenance program may be, for example, acquired from the recording medium recording the device maintenance program and a server providing the device maintenance program via a network. The device maintenance program may be installed in the HDD 14. The device maintenance program may be stored in the RAM 12 readably from the CPU 11.

The touch panel 15 may include an operation display function having an operation input function and a display function. The touch panel 15 may display a maintenance list listing operation targets including device information regarding one or more fielders, maintenance information regarding the maintenance of the fielder, and a maintenance item for the device to be the maintenance target. The touch panel 15 enables an operation input using such as a fingertip or a touch pen for the field operator. Although the case of using the touch panel 15 including the operation display function is described in the present embodiment, the device maintainer 1 may include a display including the display function and an operation input device including the operation input function.

The communication I/F 16 may be, for example, a network adapter that controls communication with the fielder 19 or communication with another devices via a wired communication or a wireless communication. The other devices may be, for example, a maintenance information management server for managing another device maintainers and the maintenance information (not shown), a DCS (Distributed Control System) controller, an FA (Factory Automation) computer, a PLC (Programmable Logic Controller).

The communication I/F 16 may control communication with the fielder 19 using a communication protocol usable in the fielder 19. Various communication protocols may be used in various fielder 19 operated in the plant. Therefore, the communication I/F 16 may control the communication with the fielder 19 by using a communication protocol corresponding to each fielder 19. For example, the communication I/F 16 may control the communication with the fielder 19 by using the ISA 100 which is a wireless communication standard of the ISA (International Society of Automation). Further, the communication I/F 16 may control the communication with the fielder 19 by using a communication protocol dedicated to industrial instruments such as a HART (Highway Addressable Remote Transducer) (registered trademark), a BRAIN (registered trademark), FOUNDATION Fieldbus, and PROFIBUS. Furthermore, the communication I/F 16 may control communication with such as the fielder 19 and the DCS by using a general-purpose communication protocol such as a wireless LAN communication, a wired LAN communication, an infrared communication, a short-distance wireless communication.

The card slot 17 may be a slot into which a PC card is inserted. The card slot 17 makes use of a function of the PC card inserted in the device maintainer 1. The PC card, for example, and provide a communication function and a storage function for realizing specific communication.

For example, such as a differential pressure gauge, a thermometer, a flow amount meter may be the fielder 19 to which the device maintainer 1 may be communicably connected. Such as the differential pressure gauge, the thermometer, the flow amount meter may be an input device for inputting a signal of physical quantity such as pressure and temperature to the device maintainer 1, or an output device for outputting a control signal for changing the degree of opening of the regulating valve from the device maintainer 1 such as a control valve. In FIG. 1, only one kind of the fielder 19 described above is shown, however, as described above, various fielders 19 may be used in the plant and the device maintainer 1 may be connected with a plurality of fielder 19.

Figure 2:
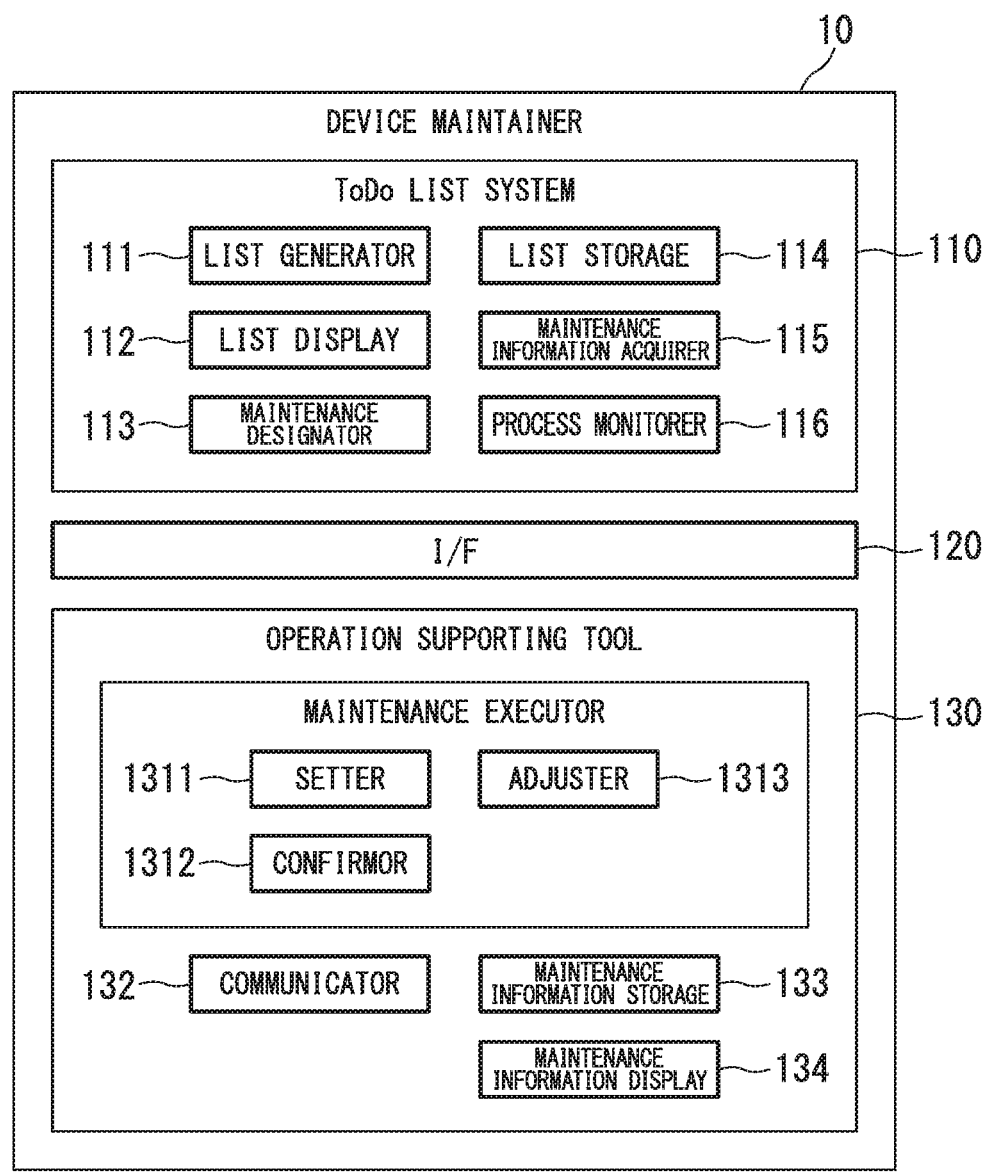
FIG. 2 is a block diagram showing an example of a functional configuration of the device maintainer according to the present embodiment of the invention.

Next, with reference to FIG. 2, the functional configuration of the device maintainer will be described. FIG. 2 is a block diagram showing an example of the functional configuration of the device maintainer 10 according to the present embodiment. In the following description, reference is made to FIG. 1 as appropriate.

In FIG. 2, the device maintainer 10 may include each function of a ToDo list system 110, an I/F 120, and an operation supporting tool 130. The ToDo list system 110 may include each function of a list generator 111, a list display 112, a maintenance designator 113, a list storage 114, a maintenance information acquirer 115, and a process monitorer 116. The operation supporting tool 130 may include each function of a maintenance executor 131, a communicator 132, a maintenance information storage 133, and a maintenance information display 134. The maintenance executor 131 may include each function of a setter 1311, a confirmor 1312, and an adjuster 1313. The each function of the device maintainer 10 may be realized by executing a program in the CPU 11 shown in FIG. 1. That is, the above-noted each function of the device maintainer 10 may be a functional module realized by software.

The ToDo list system 110 may generate and manage a ToDo list. The operation supporting tool 130 may support the maintenance operation for the fielder 19. The ToDo list system 110 may communicate with the operation supporting tool 130 via the I/F unit 120. The I/F unit 120 may be an interface between programs that provide such as commands and functions for communication between the ToDo list system 110 and the operation supporting tool 130. The ToDo list system 110 may include the function added to the device maintainer 10 including the function of the operation supporting tool 130. The function may be added, for example, by installing a program in such as the HDD 14 from a recording medium in which a program including the function of the ToDo list system 110 is recorded. The ToDo list system 110 may be added as an add-in function of the program of the operation supporting tool 130. The ToDo list system 110 and the operation supporting tool 130 may cooperate via the I/F unit 120 and realize the function of the device maintainer 10.

Figure 13:
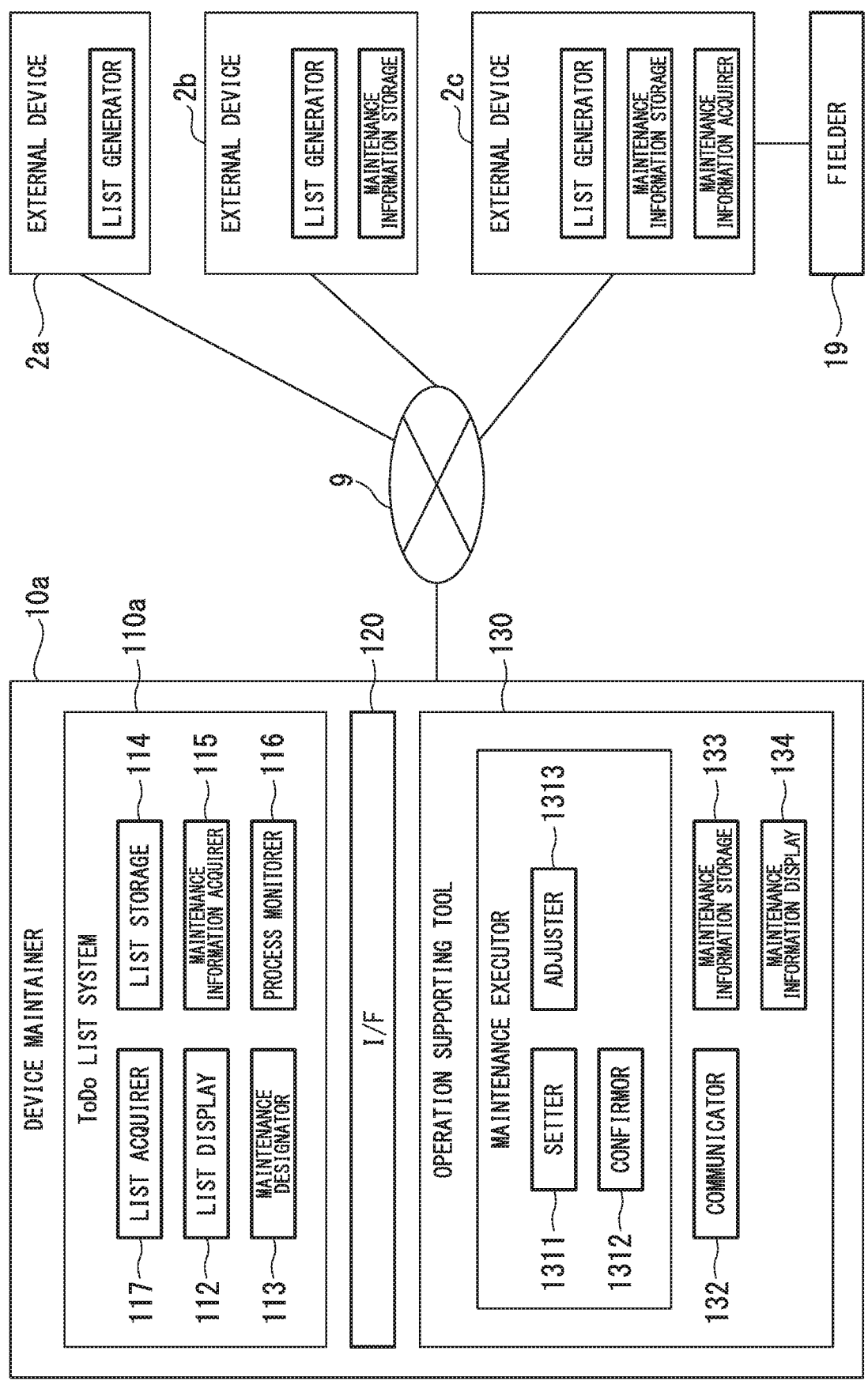
FIG. 13 is a diagram showing an example of a configuration of a device maintenance system according to the present embodiment of the invention.

The list generator 111 may generate the ToDo list exemplifying as the maintenance list which is listing the operation target including a maintenance item for the fielder to be the maintenance target. The list generator 111 may provide a UI (User Interface) for generating the ToDo list via the touch panel 15. The list generator 111 may provide, for example, the UI for generating the ToDo list by manual input. In addition, the list generator 111 may provide the UI for generating the ToDo list based on the maintenance information regarding the maintenance of the fielder, such as information on such as the maintenance result of the fielder implemented in the device maintainer 1, information on a maintenance plan of the fielder, and information on maintenance method of the fielder. In addition, the list generator 111 may acquire the device information recorded in such as a file format, and may provide the UI for generating the ToDo list based on the acquired device information. The list generator 111 may read a drawing such as a cable connection diagram or a catalog or a standard specification of the fielder 19 (hereinafter referred to as "drawing etc.") and provide the UI for generating the ToDo list based on the loaded drawing etc. The details of generating the ToDo list executed by the list generator 111 will be described later with reference to FIGS. 5 to 9. In FIG. 2, the device maintainer 10 may include the list generator 111 to generate the ToDo list. The device maintainer 10 may generate the ToDo list using the external device. When the ToDo list is generated by the external device, the device maintainer 10 may acquire the ToDo list generated by the external device. FIG. 13 shows the description of the case where the generation of the ToDo list is performed by the external device.

The list display 112 may display the ToDo list together with the maintenance information displayed in the maintenance information display 134 described later. The list display 112 may display the ToDo list in a separate window on the maintenance information screen displayed on the maintenance information display 134. The window in the present embodiment may be a rectangular display area displayed on the display screen of the touch panel 15. The list display 112 may control such as a display position, a display size, a display/non-display switching, and a valid/invalid operation of the ToDo list displayed in the separate window. A display example in which the ToDo list is displayed together with the maintenance information in the list display 112 will be described later with reference to FIG. 3. Note that the list display 112 may not be limited to the above-described display mode, and may be displayed on the same screen as the maintenance information display 134, or may be displayed by scrolling. Further, when the field operator may tap or touch the information such as the icon and the characters of the maintenance information display 134, the separate window may be activated and the list display 112 may be displayed, and the list display 112 may be displayed such as moving or switching to the separate window.

The list display 112 may display the fielder to be the maintenance target and the maintenance item for that fielder in the ToDo list. When the maintenance item displayed in the ToDo list may be executed, the list display 112 may change the display mode in the ToDo list of the maintenance item for which the maintenance has been executed. The changing of the display mode may include, for example, a changing the color and the font of the character string of the maintenance item, an attaching a strikethrough to the character string of the maintenance item, a hiding the character string of the maintenance item, and adding new characters such as "finished" to the character string of the maintenance item. Details of the ToDo list displayed on the list display 112 will be described later with reference to FIG. 4.

The list display 112 may allow the field operator to designate the maintenance item based on the displayed ToDo list. The list display 112 may change the display of the designated maintenance item when the field operator specified the maintenance item displayed in the ToDo list by tapping or touching the touch panel 15. The list display 112 may notify that the maintenance item is designated to the field operator. The field operator may designate the plural maintenance items in the list display 112.

The maintenance designator 113 may notify the maintenance item designated in the ToDo list displayed by the list display 112 to the maintenance executor 131 via the I/F unit 120. The maintenance designator 113 may cause the field operator to execute the maintenance operation. The maintenance designator 113 may sequentially notify the maintenance executor 131 of the designated maintenance item when there are plural designated maintenance items.

The list storage 114 may store the ToDo list generated by the list generator 111 in such as the HDD 14. The list display 112 may read out the stored ToDo list and display it on the touch panel 15. The list storage 114 may store the plural ToDo lists when the plural ToDo lists are generated in the list generator 111. The list display 112 may read the plural ToDo lists so that the field operator may select the ToDo list displayed on the list display 112. The list display 112 may display the plural ToDo lists, and thereby, the field operator may concurrently perform the maintenance operations over the plural ToDo lists.

The maintenance information acquirer 115 may acquire the maintenance information. The maintenance information acquirer 115 may acquire the maintenance information stored in the maintenance information storage 133. Details of the maintenance information acquired by the maintenance information acquirer 115 will be described later in the description of the maintenance information storage 133. The maintenance information acquirer 115 may acquire the device information of the maintenance target recorded in such as the file format. The maintenance information and the like acquired by the maintenance information acquirer 115 may be acquired when the ToDo list is generated by the list generator 111.

The process monitorer 116 may monitor the specified fielder 19 and the processor used in the process and may acquire such as the specific communication contents and an operation log from such as the fielder 19. The process monitorer may directly monitor the fielder 19, and thereby, may acquire the communication contents from the fielder 19 even when the maintenance operation by the operation supporting tool 130 is not performed.

The maintenance executor 131 may include functions of the setter 1311, the confirmor 1312, and the adjuster 1313, and may execute the maintenance of the fielder 19 using the operation supporting tool 130.

The setter 1311 may set the parameter exemplified as the device information used in the fielder 19 for the fielder 19 to be the maintenance target. The parameter which is set by the setter 1311 may include, for example, a name uniquely specifying the parameter, a label used for a display name of the parameter, an industrial unit (kPa, %, degree C., etc.) of the parameter, a data type of the parameter, a correction Value (calibration value). The setter 1311 may provide the UI of the parameter setting via the touch panel 15 to the field operator. For example, the setter 1311 may set the parameter on the touch panel 15 by the field operator entering a character into a text box, selecting a setting item by a pull-down menu and selecting a setting item by such as a radio button or a check box. As the initial value of the parameter set in the setter 1311, the value read in the confirmor 1312 may be used.

The confirmor 1312 may read out the parameter set for the fielder 19 to be the maintenance target and may display the contents of the read parameter on the touch panel 15. The confirmor 1312 may automatically read the parameter of the connected fielder 19 based on the information of the fielder 19 automatically connected via the communication I/F 16 recognized by the communicator 132. The confirmor 1312 may output the read parameter to the setter 1311 and may be used for setting the parameter. A matter to be displayed on the touch panel 15 may be transmitted to the external device to the device maintainer 10 via the communicator 132, or may be printed out from a printer (not shown). In addition, the confirmor 1312 may read out a property of the parameter set in the fielder 19. The confirmor 1312 may read out, for example, a device tag, a device address, a manufacturer, a device type as the property. In addition, the confirmor 1312 may execute an operation to acquire information such as a vibration, an abnormal sound from the fielder 19 to be the maintenance target.

The adjuster 1313 may adjust the fielder 19. For example, when the fielder 19 may be a pressure transmitter, the adjuster 1313 may implement a zero point adjustment of the pressure transmitter. In addition, when the fielder 19 may be an actuator, the adjuster 1313 may also include a test (inspection) function in addition to the adjustment, and may implement an operation test of operating an actuator of a valve or a cylinder.

The communicator 132 may control communication with the fielder 19 or communication with another devices via the communication I/F 16. The communication controlled by the communicator 132 may set the parameter of the fielder 19 of the standards such as an ISA 100, a HART, BRAIN, may read out the parameter, and may confirm the parameter. The communicator 132 may control such as a wireless LAN communication, a wired LAN communication, an infrared communication, a short-distance wireless communication. The communicator 132 may include a program module for controlling corresponding to each communication. The communicator 132 may be configured so that necessary program modules may be added and installed. The communicator 132 may automatically recognize the fielder 19 connected via the communication I/F 16, and may output the information of the recognized fielder 19 to the confirmor 1312.

The maintenance information storage 133 may store the maintenance information (a result of the maintenance) executed by the maintenance executor 131. For example, the maintenance information storage 133 may store the content of the parameter set to the fielder 19 of the maintenance target, and such as the setting history by the setter 1311. The maintenance information storage 133 may store the parameter read out from the fielder 19 of the maintenance target by the confirmor 1312. The maintenance information storage 133 may store a history of an adjustment of the fielder 19 executed by the adjuster 1313. The maintenance information storage 133 may store the maintenance information acquired from such as a device maintainer, a maintenance information management server, a DCS controller, an FA computer, a PLC. The maintenance information stored in the maintenance information storage 133 is acquired from the maintenance information acquirer 115. The maintenance information stored in the maintenance information storage 133 may be acquired from the maintenance information display 134 and displayed on the touch panel 15.

The maintenance information display 134 may display the maintenance information on the touch panel 15. For example, the maintenance information display 134 may acquire the maintenance information stored in the maintenance information storage 133 and may display it on the touch panel 15. Further, the maintenance information display 134 may display the maintenance information acquired from other device maintainers or the like.

In FIG. 2, the ToDo list system 110, the I/F unit 120, the operation supporting tool 130, the list generator 111, the list display 112, the maintenance designer 113, the list storage 114, the maintenance information acquirer 115, the process monitorer 116, the maintenance executor 131, the communicator 132, the maintenance information storage 133, the maintenance information display 134, the setter 1311, the confirmor 1312, and the adjuster 1313 included in the device maintainer 10 may be realized by software. However, the above-described one or more functions provided in the device maintainer 10 may be realized by hardware such as an ASIC or a gate array. In addition, each of the functions provided in the device maintainer 10 may be implemented by dividing one function into plural functions. In addition, each of the above-described functions of the device maintainer 10 may be implemented by aggregating two or more functions into one function.

In FIG. 2, however the case where the ToDo list system 110 and the operation supporting tool 130 operate on the same terminal such as the device maintainer 10 has been described, the To Do list system 110 and the operation supporting tool 130 may operate on different devices. For example, when the ToDo list system 110 operates on a server capable of communicating with the device maintainer 1 via a network, the ToDo list system 110 may communicate with the operation supporting tool 130 via the network.

In FIG. 2, however, the case where the ToDo list system 110 and the operation supporting tool 130 communicate in a one-to-one relationship has been described, the ToDo list system 110 and the operation supporting tool 130 may communicate in a one-to-many, many-to-one or in a many-to-many relationship. For example, the plural operation supporting tools 130 may share the ToDo list generated in the ToDo list system 110 by the ToDo list system 110 and the operation supporting tool 130 communicating in the one-to-many manner, and thereby, it may be possible for the plural the field operators to share the maintenance operation based on the one ToDo list.

Figure 3:
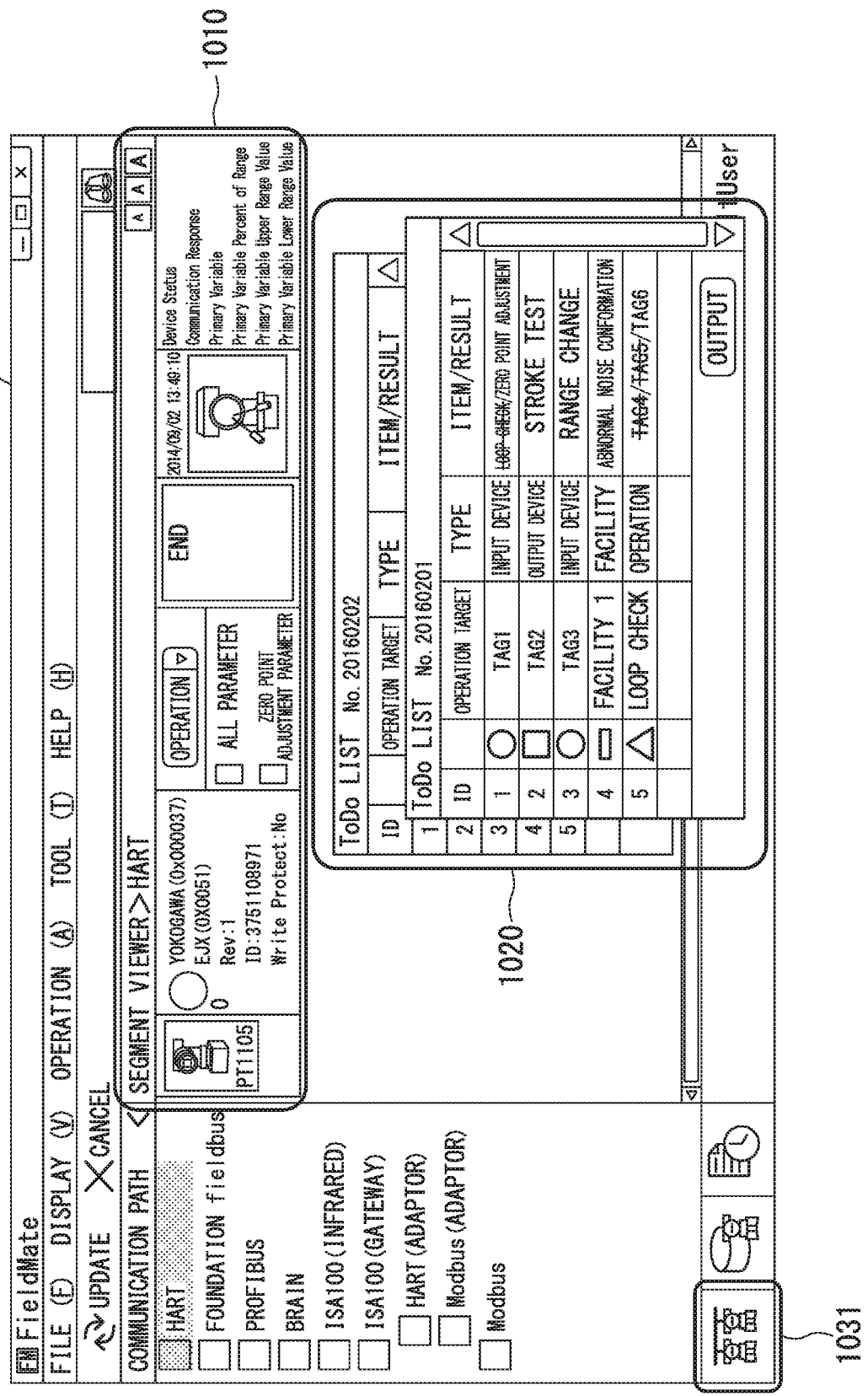
FIG. 3 is a diagram showing an example of maintenance information and a ToDo list displayed by the device maintainer according to the present embodiment of the invention.

With reference to FIG. 3, the maintenance information and the ToDo list displayed on the touch panel 15 in the device maintainer 1 will be described. FIG. 3 is a diagram showing an example of the maintenance information and the ToDo list displayed on the device maintainer 1 in the present embodiment. In the following description, FIG. 1 or FIG. 2 will be referred to as appropriate.

In FIG. 3, a main screen 1000 may be displayed on a display screen of the touch panel 15. The main screen 1000 may be, for example, the display that is firstly displayed after activating the device maintainer 1. The main screen 1000 may be displayed after activating the device maintainer 1, after being performed a login operation on a login screen (not shown), or after being performed an initial setting.

The main screen 1000 may be the screen for displaying and registering the maintenance information of the fielder 19. The main screen 1000 may display such as the maintenance information 1010 and the segment viewer select button 1031. The main screen 1000 may be displayed by the maintenance information display 134. The ToDo list 1020 may be superimposed and displayed on the main screen 1000. The ToDo list 1020 may be displayed by the list display 112. The information of the maintenance information 1010 and the ToDo list 1020 included in the main screen 1000 may be updated and displayed again by pressing the "update" button shown on the upper left of the main screen 1000 in FIG. 3. The maintenance information 1010 may indicate such as an icon, the device tag, a status indicating whether the diagnostic result is normal or abnormal, the device address, the manufacturer, a device ID, the device type, the device information such as status information indicating whether writing on the parameter is protected, the maintenance item, and parameter values, of the fielder 19 stored in the maintenance information storage 133. The maintenance information 1010 may include such as image information, and tag information that can leave a memo writing as a text. The maintenance information 1010 may display the maintenance information 1010 for the fielder 19 automatically recognized by the communicator 132. FIG. 3 shows a case where the maintenance information 1010 for a temperature measurer with the device tag of the PT 1105 is displayed. The maintenance information 1010 may be displayed for each the fielder 19. That is, when the plural fielder 19 are connected, the maintenance information 1010 corresponding to the number of the connected fielder 19 may be displayed.

The ToDo list which represents the "No. 20160201" and the ToDo list which represents the "No. 20160202" may be displayed together with the maintenance information 1010 on the main screen 1000. The number of the ToDo lists displayed together with the maintenance information 1010 may be set to an arbitrary number including 0 (not displayed). The details of the ToDo List 1020 will be described later with reference to FIG. 4. The "output" button in the ToDo list 1020 may be a button for outputting the contents of the ToDo list 1020. An example of output when the output button is pressed will be described later with reference to FIG. 11.

The segment viewer select button 1031 may be a select button for displaying the main screen 1000 shown in FIG. 3. The main screen may also be switched to such as a device navigator screen for managing the maintenance information 1010 stored in the maintenance information storage 133 or searching the maintenance information 1010 stored in the maintenance information storage 133 and an operation log screen for displaying the record of the operation performed by the operation supporting tool 130. The ToDo list 1020 may be displayed together with the maintenance information 1010 displayed on another display screen other than the main screen 1000.

Next, with reference to FIG. 4, the details of the ToDo list 1020 displayed on the touch panel 15 in the device maintainer 1 will be described. FIG. 4 is a diagram showing an example of details of the ToDo list 1020 displayed by the device maintainer in the present embodiment.

In FIG. 4, the ToDo list 1020 may indicate such as a list ID 1021, a device icon 1022, an operation target 1023, a type 1024, and an item/result 1025.

The list ID 1021 is information for uniquely specifying one operation target in the To Do list 1020. In the present embodiment, one ID portion of the ToDo list 1020 shown in FIG. 4 is referred to as "one operation target". The operation target is an execution unit of the maintenance operation and which are exemplified such as a case of being setting for each fielder 19 specified by the device tag, setting for each facility, and setting for each task. For example, the value of the ID 1021 may be set to be assigned or checked so as not to overlap with other IDs. Further, the ID 1021 may be updated to a new ID 1021 if the maintenance operation of the operation target 1023 to which the ID 1021 is attached is completed. Along with the operation, the ID 1021 of another operation targets 1023 which are not the target of the maintenance operation may be updated to another ID 1021 as appropriate.

The device icon 1022 may display the type of the fielder 19 represented in the type 1024 by using such as a figure so that the field operator can visually recognize it. For example, the circular icon shown in FIG. 4 may indicate that the type of the fielder 19 is an input device. Similarly, the square icon may indicate an output device, the oblong rectangle icon may indicate the facility, and the triangle icon may indicate a task. In the device icon 1022, for example, the names and pictures of the fielder 19 may be displayed in addition to the display of the exemplified figures.

The operation target 1023 may indicate the fielder 19, the facility, or the maintenance operation of the maintenance target. For example, when one fielder 19 is defined as operation target 1023, a device tag such as "TAG 1" for identifying the fielder 19 is used. In a case of the facility or the task which are not communicating, a facility name and a task item are entered. For example, a "facility 1" may indicate that a confirmation of an abnormal sound by auditory sense of the field operator may be set to the operation target 1023. In the task item, a maintenance operation name for the fielder 19 such as a "loop check", a "zero-point adjustment" may be entered. The field operator may enter the task items other than a maintenance of the fielder 19 such as a cleaning task in the task item. The operation makes it possible to manage the maintenance operation of the fielder and another tasks with the same ToDo list.

The operator may input whether the fielder 19 of the operation target 1023 in the ToDo list 1020 is an input device or an output device on the type 1024. Also, the type 1024 may indicate that the operation target 1023 in the ToDo list 1020 may be the facility or the task that does not communicate.

The item/result 1025 may display the maintenance item and the maintenance result. The item/result 1025 may be displayed by changing the maintenance item for which the maintenance operation has not yet been executed and the maintenance mode for which the maintenance has been executed. In FIG. 4, as an example of the change of the display mode, the maintenance item on which maintenance has been executed may show a case where a strikethrough is added to the letters of the maintenance item. The changing of the display mode may be, for example, a size of characters of the maintenance item, a color of the characters, a font of the characters, a filling of the background of the characters, an erasing of the characters, an addition of the characters such as "done". The item/result 1025 of the operation target 1023 on which the maintenance has been executed may be assigned the number of the lower ID 1021, and the item/result 1025 may be moved further downward and displayed in the ToDo list 1020. Along with the operation, the ID 1021 assigned to the item/result 1025 of the operation target 1023 which is not the target of the maintenance operation may be newly assigned with a higher ID 1021 or a lower ID 1021. The field operator may easily grasp the progress status of the maintenance operation by changing the display mode of the maintenance item where the maintenance has been executed and displaying the ToDo list 1020. In FIG. 4, the strikethrough shows that the maintenance item of a "loop check" in the operation target 1023 of which the list ID 1021 is "1" has been executed. The operation target 1023 of which the ID 1021 is "5" may indicate that the maintenance items of a "TAG 4" and a "TAG 5" of the fielder have been executed. As shown in the item/result 1025 in FIG. 4, the maintenance item may include a zero-point adjustment of a pressure, a stroke test of a control valve, a measurement-range change of the pressure, and abnormal noise conformation from the facility.

By the way, in FIG. 4, as described above, in the operation target 1023 of which the list ID 1021 is "1", the plural maintenance items such as a "loop check" and a "zero-point adjustment" may be input to the fielder 19. Also, in the operation target 1023 of which the list ID 1021 is "5", the plural device tags as plural maintenance items such as a "TAG 4/TAG 5/TAG 6" may be input for the task of the loop check which is input to the operation target 1023.

In the maintenance operation of the fielder 19, it may be more efficient to continuously perform the plural maintenance operations to the same fielder 19, while it is more efficient to continuously perform the same maintenance operation to the plural fielders 19.

In the present embodiment, the list generator 111 may generate the ToDo list 1020 including the plural maintenance items in the operation target 1023, and the list display 112 may display the generated maintenance list, and may designate one or more maintenance items among the plural maintenance items. That is, the list generator 111 and the list display 112 make it possible to input the plural maintenance operations as the maintenance item for the fielder 19, and input the plural fielder 19 as the maintenance item for the maintenance operation. Therefore, in the present embodiment, in any of the above-described maintenance operations, the device maintainer 10 may generate the ToDo list 1020 in consideration of the efficiency of the maintenance operation.

The order of the execution of the maintenance target or the maintenance item in the ToDo list 1020 is arbitrary. For example, the list ID 1021 may be displayed in ascending or descending order in the list display 112. Also, the list ID 1021 may be displayed in an order different from the ascending or descending order in the list display 112. Also, the list display 112 may notify the order of the execution to the field operator by displaying the ToDo list 1020. For example, the list display 112 may inform the field operator of the order of the next execution by changing the color of the characters or blinking the characters of the list ID 1021 or the maintenance item. Further, the order of the display of the ToDo list 1020 may be changed. For example, the list display 112 may sort the order of the other lists according to the order of the operation target 1023 and the item/result 1025 of the ToDo list 1020. In addition, the list generator 111 may merge the plural ToDo lists 1020 into one ToDo list 1020, and may divide the one ToDo list 1020 into the plural ToDo lists 1020. Also, an output item may be selected in the output of the ToDo list 1020 in the list display 112.

Next, with reference to FIG. 5, a screen for generating the ToDo list by manual input generated by the list generator 111 will be described. FIG. 5 is a diagram showing an example of the screen for generating the ToDo list 1020 by manual input displayed by the device maintainer 10 in the present embodiment.

In FIG. 5, an input screen 1040 of the operation target 1023 is the display screen displayed on the touch panel 15 so that the operation target 1023 may be selected. The field operator generating the ToDo list 1020 may select a menu for generating the ToDo list 1020 from such as the touch panel 15. The list generator 111 may display the input screen 1040 of the operation target 1023 shown in FIG. 5 if the menu for generating the ToDo list 1020 is selected. The field operator may select one or more operation targets 1023 to be included in the ToDo list 1020 among the displayed operation target 1023. The field operator may select the operation target 1023 by operating such as the touch panel 15. The field operator may select the operation target 1023 and then press an OK button to determine the operation target 1023. When the OK button of the touch panel 15 is pressed, the list generator 111 may generate the ToDo list 1020 including the selected operation target 1023. The list generator 111 may display the input screen 1040 of the operation target 1023 based on information stored in the maintenance information storage 133.

The task efficiency 1023 of generating the ToDo list 1020 may improve by displaying the input screen 1040 of the operation target 1023 on the list display 112. In addition, it may prevent erroneous input of the operation target by selectable displaying the pre-stored operation target 1023 in the input screen 1040 of the list display 112. Also, the list display 112 may display only the information of the operation target 1023 on the input screen 1040 and not display any information other than the operation target 1023 on the input screen 1040, thereby being able to prevent the erroneous input of the operation target 1023.

Figure 6:
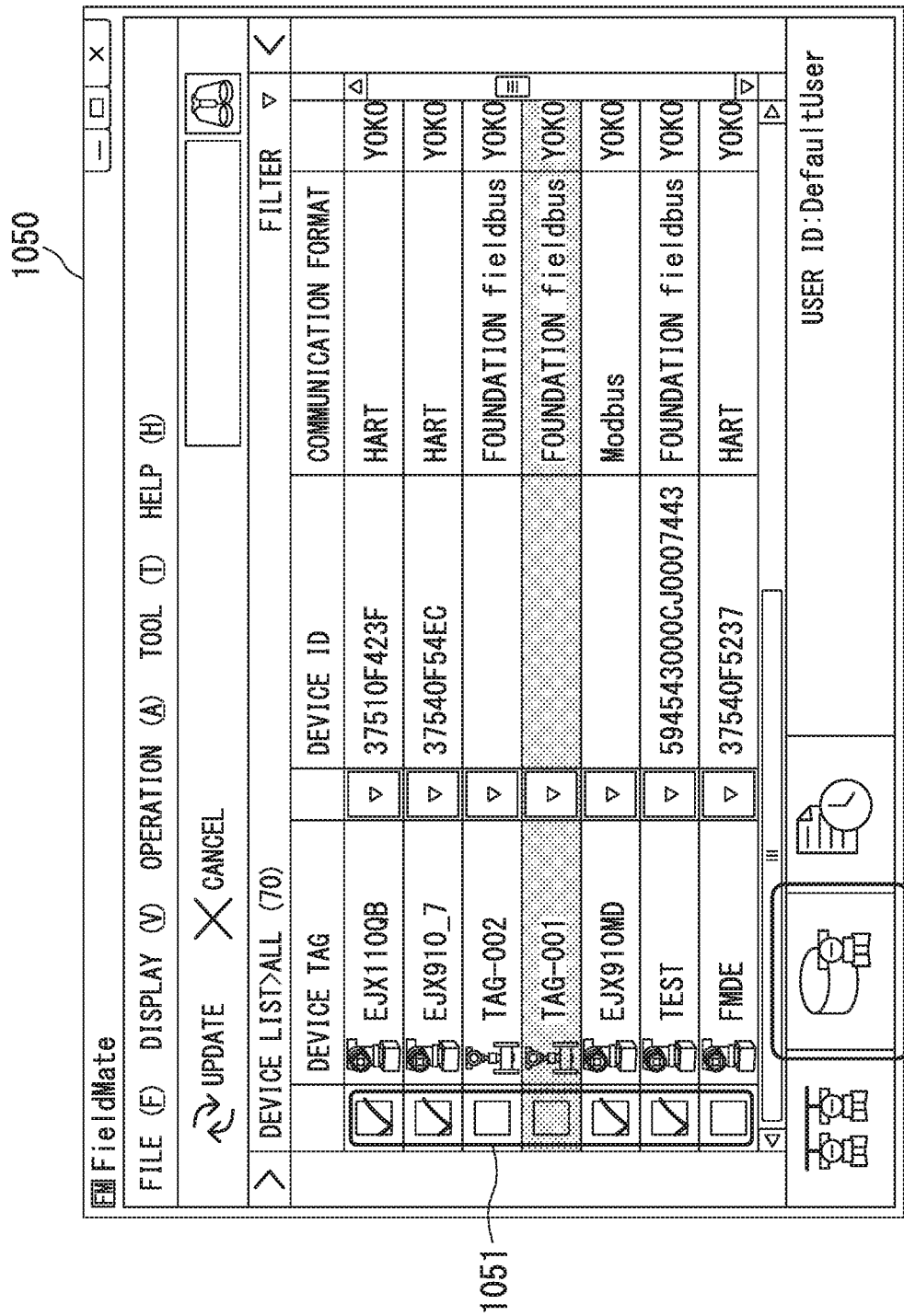
FIG. 6 is a diagram showing an example of a screen for generating the ToDo list based on the maintenance information displayed by the device maintainer according to the present embodiment of the invention.

Next, referring to FIG. 6, a screen for generating the ToDo list based on the maintenance information 1010 displayed by the list generator 111 will be described. FIG. 6 is a diagram showing an example of a screen for generating the ToDo list 1020 based on the maintenance information 1010 displayed by the device maintainer 10 in the present embodiment.

In FIG. 6, the device navigator screen 1050 is a screen for managing the maintenance information 1010 stored in the maintenance information storage 133 or for searching the maintenance information 1010 stored in the maintenance information storage 133. The device navigator screen 1050 may contain information such as the device tag, the device ID, a communication format for the fielder 19. In FIG. 6, the ToDo list 1020 may be generated from the device navigator screen 1050.

First, the field operator that generates the ToDo list 1020 may select one or more operation target 1023 to be included in the ToDo list 1020 from a check box 1051 provided next to each device tag of the device navigator screen 1050. The maintenance information display 134 may display the device navigator screen 1050 based on the maintenance information 1010 stored in the maintenance information storage 133. The list generator 111 may display the device navigator screen 1050 by adding the check box 1051 to the displayed device navigator screen 1050. The list generator 111 may associate the check box 1051 with the operation target 1023 based on the maintenance information 1010 acquired by the maintenance information acquirer 115. The field operator may select the operation target 1023 by checking the check box 1051. In the state where the operation target 1023 is selected on the device navigator screen 1050, the field operator may select, for example, the menu for generating the ToDo list 1020. If the menu for generating the To Do list 1020 is selected, the list generator 111 may generate the ToDo list 1020 including the selected operation target 1023.

Since the field operator may select the operation target 1023 from the device navigator screen 1050 in the device maintainer 10, it may be possible to improve the task efficiency for generating the ToDo list 1020, and to prevent erroneous input of the operation target 1023.

Next, with reference to FIG. 7, a procedure for generating the ToDo list 1020 from device information will be described. FIG. 7 is a diagram showing an example of device information acquired by the device maintainer 10 at the time of generating the ToDo list 1020 in the present embodiment. It is assumed that the device information shown in FIG. 7 may be acquired from the outside of the device maintainer 10 by such as a file format.

In FIG. 7, the device information 1060 may include information of the device tag, the device ID, and the device address. The device information 1060 may be acquired by such as a CSV (Comma Separated Values) file, a file created by spreadsheet software. For example, in FIG. 2, the maintenance information acquirer 115 may acquire such as the file including the device information 1060 from an external device connected via the communicator 132 or from a card slot 17 in FIG. 1. The list generator 111 may display the input screen 1040 shown in FIG. 5 based on the acquired device information 1060 to select the operation target 1023.

The device maintainer 10 may acquire the device information 1060. Thereby, the device maintainer 10 may selectably display the operation target 1023 on the main screen 1000 and may be included in the ToDo list 1020 even if the maintenance information 1010 does not exist in the maintenance information storage 133 because the operation target 1023 is newly installed in the plant. It may be possible to improve the task efficiency of generating the ToDo list 1020 and to prevent the erroneous input.

Next, a generation of the ToDo list 1020 using the cable connection diagram will be described with reference to FIG. 8. FIG. 8 is a diagram showing an example of the cable connection diagram acquired by the device maintainer 10 at the time of generating the ToDo list according to the present embodiment.

In FIG. 8, the cable connection diagram 1070 shows a connection between a LOCAL, a terminal board, a cable, an 10 module and a connector. The cable connection diagram 1070 shows each cable in the LOCAL attaching a tag name as the operation target 1023. For example, the TAG 1 is connected to terminal numbers 1 and 2 of the 101 terminal board by two-wire CVV (S) cable and further connected to a terminal numbers 1 and 2 of an input module (AI) of the IO module. A cable connection diagram 1070 is obtained such as by a CSV file similarly to the device information 1060 described in FIG. 6. The maintenance information acquirer 115 may acquire a file including the cable connection diagram 1070 from such as an external device connected via a communicator 132. A list generator 111 may acquire maintenance information 1010 related to or corresponding to each terminal board and the IO module for each tag name of the cable. The list creation unit 111 may generate the items/results 1025 related to or corresponding to such as the terminal board, the IO module based on the acquired maintenance information 1010 of the cable connection diagram 1070. The list generator 111 may generate an input screen and the ToDo list 1020 shown in FIG. 5 and display it on the main screen 1000 so that the task target 1023 may be selectably displayed.

It may be possible to improve the task efficiency and prevent the erroneous input when generating the ToDo list 1020 by acquiring the cable connection diagram 1070.

Figure 9:
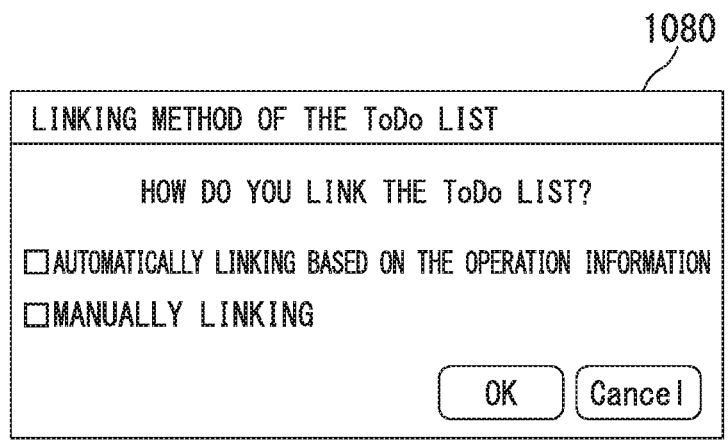
FIG. 9 is a diagram showing an example of a setting screen of an associating method of the ToDo list displayed by the device maintainer according to the present embodiment of the invention.

Next, with reference to FIG. 9, a setting of a linking at the time of generating the ToDo list 1020 will be described. FIG. 9 is a diagram showing an example of a setting screen of a linking method of the ToDo list 1020 displayed by the device maintainer 10 in the present embodiment.

In FIG. 9, the setting screen 1080 of the linking method may include two check boxes of whether the linking is performed automatically or manually. Only one of the two check boxes may be selected. For example, the setting screen 1080 may be displayed by the list generator 111 by selecting the menu for generating the ToDo list 1020 on the touch panel 15 by the field operator generating the ToDo list 1020. A setting as to whether the linking is to be performed automatically or manually may be saved in the list generator 111 by pressing the OK button.

Figure 10:
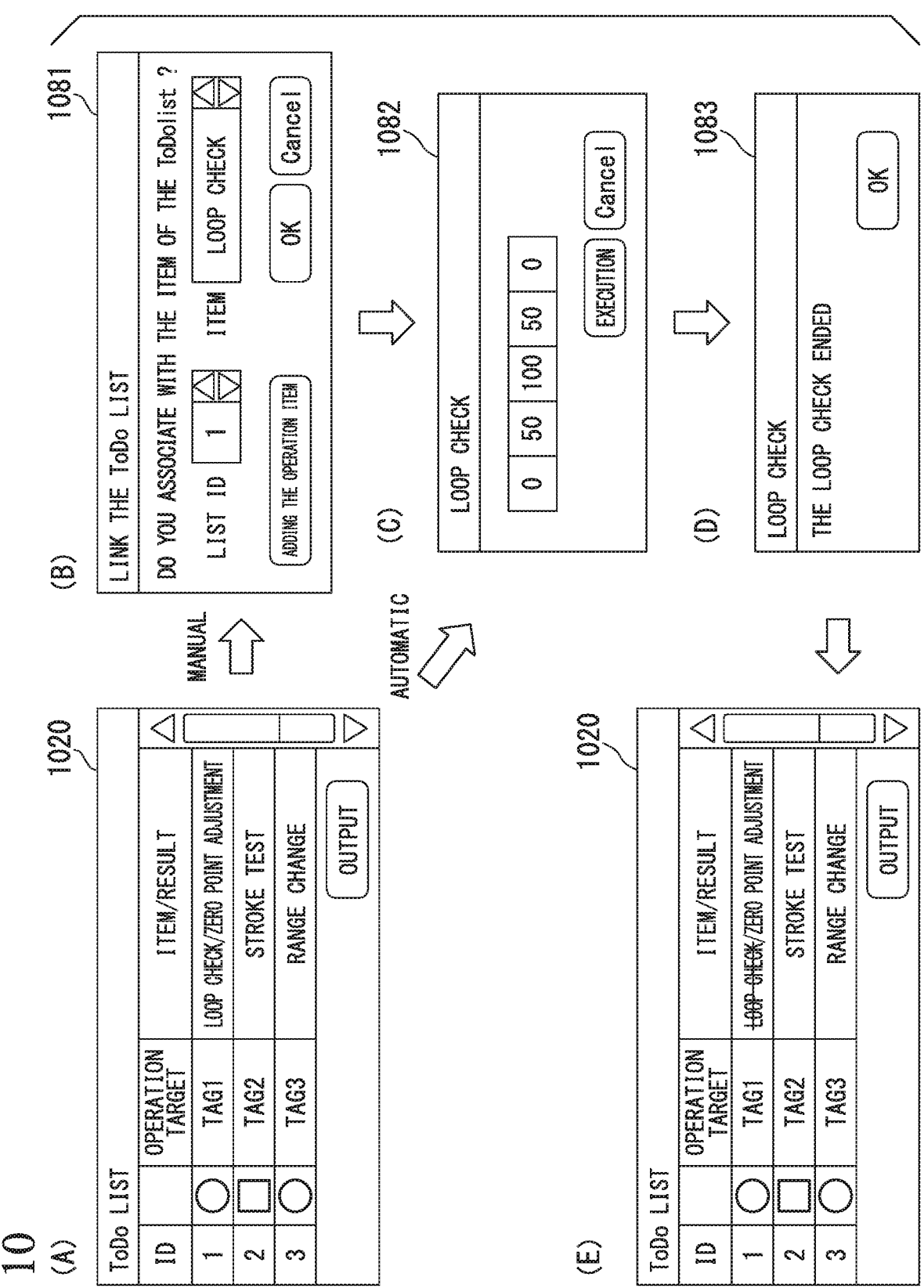
FIG. 10 is a diagram showing an example of a flow of the maintenance operation using the ToDo list displayed by the device maintainer according to the present embodiment of the invention.

Next, with reference to FIG. 10, a flow of the maintenance operation using the ToDo list 1020 will be described. FIG. 10 is a diagram showing an example of the flow of the maintenance operation by using the ToDo list 1020 displayed by the device maintainer in the present embodiment. FIG. 10A to 10E show a transition of the display screen for performing the maintenance operation by using the ToDo list 1020 in chronological order.

In FIG. 10A, the field operator may select the operation target 1023 and the maintenance item of the maintenance operation from the ToDo list 1020 displayed on the touch panel 15. Here, when a manual setting is made in the setting of the linking described in FIG. 9, the setting screen for manually performing the linking in FIG. 10B is displayed. It is possible to change the maintenance item displayed in FIG. 10A by manually performing the linking in FIG. 10B. The change of the maintenance item is, for example, an addition of the maintenance item, a deletion of the maintenance item, a change to another maintenance item, or the like.

In FIG. 10B, the field operator may select the list ID 1021 for linking from the pull-down menu and select the maintenance item to be linked to the list ID 1021 from the pull-down menu. When adding the maintenance item, the maintenance item may be added to the selected list ID 1021 by pressing an additional button of the task item. When the setting is completed, the loop check screen of FIG. 10C may be displayed by the field operator pressing the OK button.

On the other hand, if the automatic is already set in the setting of the linking described in FIG. 9, the setting screen in FIG. 10B may not be displayed and the display screen may transit from 10A to FIG. 10C.

FIG. 10C is a screen for executing the loop check. The loop check is the maintenance operation that checks the fielder's control loop. FIG. 10C shows that, as a loop check, it may be set that an execution of the loop check in which the indication adjustment output is 0% to 50% to 100% to 50% to 0%. When the field operator presses the execution button, the loop check may be executed. When the loop check is completed, the display of the display screen may transit to FIG. 10D.

FIG. 10D is a screen for informing the field operator that the loop check has ended. When the OK button is pressed by the field operator, the display of the display screen may transit to FIG. 10E.

FIG. 10E shows the display of the ToDo list 1020 same as FIG. 10A. If the list ID is 1, the display mode of the maintenance item of the loop check may be changed to a character with a strikethrough character, and the field operator may be notified that the loop check has been performed. The field operator may output the maintenance result of the ToDo list 1020 by pressing the output button.

Figures 11, 12:
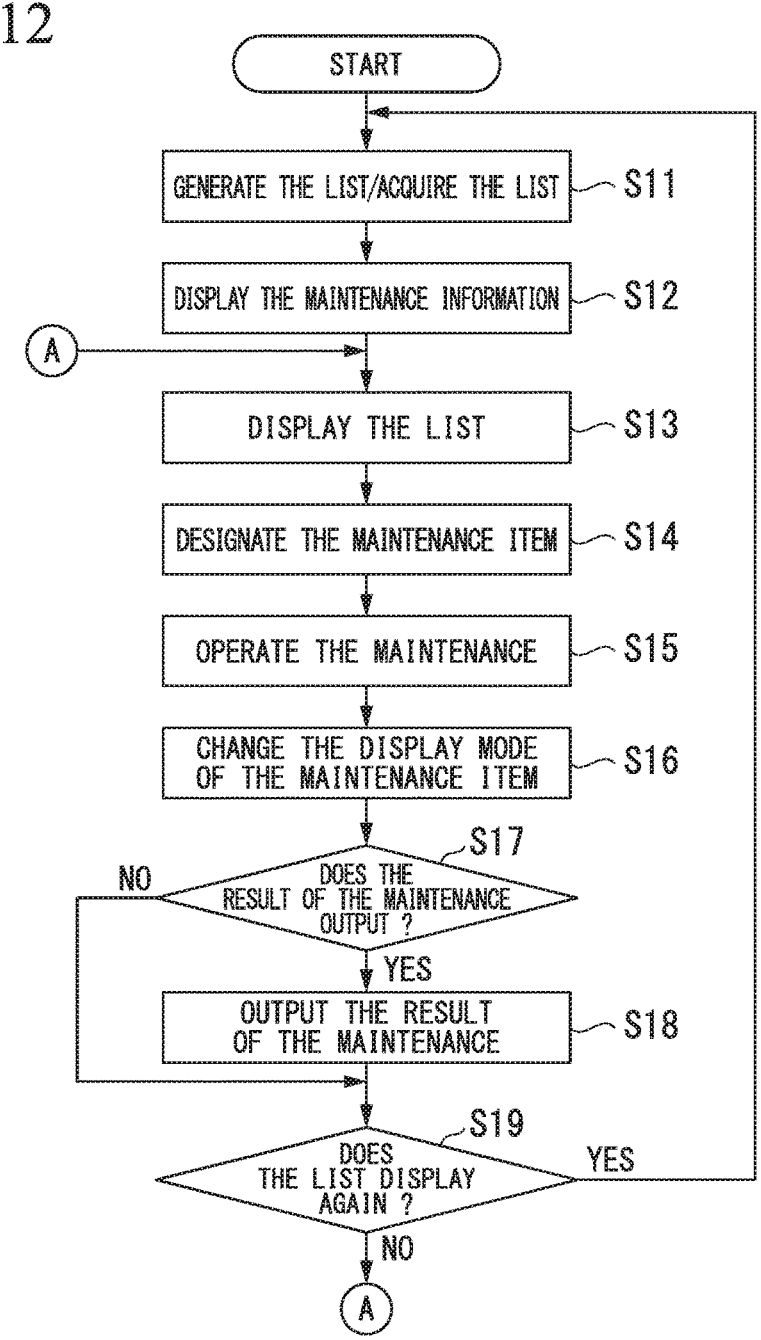
FIG. 11 is a diagram showing an example of a maintenance result output by the device maintainer according to the present embodiment of the invention.
FIG. 12 is a flowchart showing an example of an operation of the device maintainer according to the present embodiment of the invention.

Next, with reference to FIG. 11, the output of the maintenance result when the output button of the ToDo list 1020 is pressed will be described. FIG. 11 is a diagram showing an example of the maintenance result output by the device maintainer 10 in the present embodiment.

In FIG. 11, the maintenance result 1091 may include the operation target 1023, the maintenance item, an output item such as a result and a completion time. For example, the TAG 1 may indicate the check result of the loop check is OK, and the result of the zero-point adjustment was NG. In addition, it may show that the maintenance items of the TAG2 and the TAG3 are not yet implemented. The output maintenance result 1091 may be stored in such as the maintenance information storage 133. Further, the maintenance result 1091 may be outputted to the printer and printed. Furthermore, the maintenance result 1091 may be output to another device via the communicator 132.

Next, with reference to FIG. 12, an operation of the device maintainer 10 will be described. FIG. 12 is a flowchart showing an example of the operation of the device maintainer 10 in the present embodiment. It is assumed that the operation shown in the flowchart of FIG. 12 is implemented by software executed in the CPU 11.

In FIG. 12, the CPU 11 may generate the ToDo list 1020 exemplified as the maintenance list listing the maintenance items for the fielder 19 of the maintenance target (step S11). When the ToDo list 1020 may be generated in the external device 2, the CPU 11 may acquire the ToDo list 1020 from the external device 2 (step S11).

After executing the process of step S11, the CPU 11 may display the maintenance information regarding the maintenance of the fielder 19 on the touch panel 15 (step S12).

After executing the processing of step S12, the CPU 11 may display the generated or acquired ToDo list 1020 together with the maintenance information displayed on the touch panel 15 (step S13), so that the maintenance item may be designated for the field operator.

After executing the processing of step S13, the CPU 11 may acquire the maintenance item designated from such as the touch panel 15 by the field operator (step S14), and execute the designated maintenance item (step S15).

After executing the process of step S15, the CPU 11 may change the display mode of the maintenance item for which the maintenance has been executed and display the ToDo list 1020 (step S16).

After executing the process of step S16, the CPU 11 may determine whether to output the maintenance result (step S17). Whether to output the maintenance result may be determined depending on whether the output button of the ToDo list 1020 is pressed. If it is determined to output the maintenance result (step S17: YES), the CPU 11 may output the maintenance result (step S18).

After executing the process of step S18 or when determining not to output the maintenance result (step S17: NO), the CPU 11 may determine whether to update the ToDo list 1020 (step S19). Whether to update the ToDo list 1020 may be determined, for example, based on whether the update button described in FIG. 3 is pressed.

When determining to update the ToDo list 1020 (step S19: YES), the CPU 11 may return to the process of step S11 and again execute the process such as generation of the ToDo list 1020. On the other hand, when determining to not update the ToDo list 1020 (step S19: NO), the CPU 11 may return to the process of step S13 and display the ToDo list 1020.

Next, with reference to FIG. 13, a configuration of the device maintenance system in the case where the device maintainer 10 is the device maintainer 10a without the list generator 111 will be described. FIG. 13 is a diagram showing an example of a configuration of the device maintenance system in the present embodiment.

In the device maintenance system shown in FIG. 13, the device maintainer 10a may be communicably connected with the external device 2a, the external device 2b, or the external device 2c via the network 9. The external device 2a may include the list generator 21 and a list storage 22. The external device 2b may include the list generator 21, the list storage 22, and a maintenance information storage 23. The external device 2c may include the list generator 21, the list storage 22, the maintenance information storage 23, and a maintenance information acquirer 24. The external device 2a, the external device 2b, and the external device 2c is modifications of the external device 2, and it suffices that at least one device is connected with the network 9.

The external device 2a to 2c may include the list generator 21 and the list storage 22. The list generator 21 may generate the ToDo list 1020 based on the maintenance information. The list storage 22 may store the ToDo list 1020 generated by the list generator 21 and provide the ToDo list 1020 to the plural device maintainers 10a via the network 9. It is possible to share the ToDo list 1020 generated by the external device 2 by the plural device maintainers 10a by generating the ToDo list 1020 with the external device 2 and providing the ToDo list 1020 to the device maintainer 10a. For example, if the external device 2 is a maintenance management server that manages the maintenance information and generates a maintenance plan, the device maintainer 10a may acquire the ToDo list 1020 directly from the maintenance management server.

The device maintainer 10a may include the ToDo list system 110a, and the other functions are the same as those of the function of the device maintainer 10 described in FIG. 2. The ToDo list system 110a may include the function of a list acquirer 117 instead of the function of the list generator 111 of the ToDo list system 110.

The list acquirer 117 may acquire the ToDo list 1020 generated and stored by the external device 2 via the network 9. The list storage 114 may temporarily store the ToDo list 1020 acquired by the list acquirer 117. By temporarily storing the ToDo list 1020 in the list storage 114, it may be possible to utilize the ToDo list 1020 even when, for example, the device maintainer 10a cannot communicate with the external device 2 via the network 9.

The external device 2b and the external device 2c may include the maintenance information storage 23 for the external device 2a. The device maintainer 10a may further acquire the maintenance information in addition to the ToDo list 1020 from the external device 2b or the external device 2c. For example, if the external device 2b or the external device 2c is the maintenance management server that collects and saves the maintenance information, the device maintainer 10a may acquire the maintenance information collected by the maintenance management server in addition to the maintenance information collected from the fielder 19 etc. itself.

The external device 2c may further include the maintenance information acquirer 24. For example, the maintenance information acquirer 24 may acquire the maintenance information from the fielder 19 on the online. The maintenance device 10a may further acquire, for example, the maintenance information on the online acquired by the external device 2c.

In the present embodiment, the device maintainer may include a list generator and generate the maintenance list in which the maintenance items for the maintenance target device are listed. For example, the device maintainer may not include the maintenance list generator. That is, the device maintainer may acquire the maintenance list generated by another device and use the acquired maintenance list. For example, the device maintainer may have: a maintenance information display for displaying maintenance information regarding a maintenance of a device; a list acquire for acquiring a maintenance list listing maintenance items for the device which is the maintenance target; a list display for displaying the maintenance list acquired together with the displayed maintenance information so that the maintenance item may be designated; a communicator for communicably connecting the device designated by the maintenance item via a predetermined communication protocol; and a maintenance executor for executing the maintenance based on the maintenance item designated for the connected device. The list display may change the display mode of the maintenance item for which the maintenance has been performed and display the maintenance list.

In the present embodiment, the list display may display the maintenance list generated together with the displayed maintenance information, and may designate the maintenance item. Other functions may display the maintenance item. In the present embodiment, as described in FIG. 4 and the like, the maintenance item displayed in the ToDo list may be selected by displaying the ToDo list. For example, the ToDo list may not include the display for selecting the maintenance item. The display in which the maintenance item may be selected when the operation target such as the TAG 1 is selected may be displayed which is separated from the display of the ToDo list.

In the present embodiment, the list display may display the maintenance list together with the maintenance information, as shown in FIG. 3, by displaying the ToDo list in the separate window on the maintenance information screen. For example, the ToDo list may be displayed in a predetermined display area of the display screen displaying the maintenance information. Also, the ToDo list may switchably display the display screen displaying the maintenance information. That is, the display of the maintenance list in the present embodiment may include a state in which display data to be displayed on the display screen is generated. For example, the ToDo list may be displayed by switching a region to be displayed, which is a part of an area of the display screen on which the display screen displayed on the touch panel is generated.

The above-described various processes of the present embodiment may be performed by recording a program for implementing the functions of the device described in the present embodiment in a computer readable recording medium, and causing the computer system to read and execute the program recorded in the recording medium. Note that the "computer system" referred to here may include hardware such as an OS and peripheral devices. In addition, the "computer system" may include a website providing environment or a display environment as long as it is using a WWW system. In addition, the "computer readable recording medium" may be the storage such as a writable non-volatile memory such as a flexible disk, a magneto-optical disk, a ROM, and a flash memory, a portable medium such as a CD-ROM, a hard disk built in the computer system.

Further, the "computer readable recording medium" may include a program for a certain period of time such as a server when a program is transmitted via such as the network of the Internet or a communication line such as a telephone line and a volatile memory such as a DRAM (Dynamic Random Access Memory Memory) in a computer system serving as a client. Furthermore, the program may be transmitted from a computer system in which the program is stored in a storage or the like to another computer system via a transmission medium or by a transmission wave in a transmission medium. Here, the "transmission medium" for transmitting the program refers to a medium having a function of transmitting information such as a network (communication network) such as the Internet and a communication line such as a telephone line. Moreover, the program may be for realizing a part of the above-described functions. Further, a so-called difference file or difference program may be used, which may realize the above-described function in combination with the program already recorded in the computer system.

Although the embodiment of the present invention has been described with reference to the drawings, the specific configuration is not limited to the present embodiments, and various modifications are also included without departing from the gist of the present invention.

What is claimed is:

1. A device maintainer comprising:
   at least one memory storing instructions; and
   at least one processor configured to execute the instructions to:
   display a first screen including a maintenance list, the maintenance list listing a plurality of devices which are maintenance targets and a plurality of maintenance items for each of the plurality of devices, the first screen enabling designation of a device of an operation target:
   display a second screen including an execution button for executing at least one maintenance item linked with the operation target selected in the first screen among the plurality of maintenance items linked with the selected operation target;
   execute maintenance based on the at least one maintenance item linked with the selected operation target when the execution button is pressed in the second screen; and
   when the at least one maintenance item linked with the selected operation target has ended, display the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

2. The device maintainer according to claim 1, wherein the maintenance item includes a maintenance item of which a maintenance operation has not yet been executed and a maintenance item of which a maintenance operation has been executed, and
   the at least one processor is further configured to execute the instructions to change a display mode of the maintenance item of which the maintenance operation has been executed and display, on the maintenance list, the maintenance item of which the display mode is changed for notifying to a field operator that the maintenance item has been done.
   the maintenance list includes the plural maintenance items to be enabling designation.

3. The device maintainer according to claim 1, wherein the maintenance list includes the plural maintenance items regarding the operation target and enables designation the maintenance item from among the plural maintenance items.

4. The device maintainer according to claim 1, wherein the at least one processor is further configured to execute the instructions to display an operator for outputting a result of the executed maintenance.

5. The device maintainer according to claim 3, wherein the at least one processor is further configured to execute the instructions to:
generate the maintenance list; and
display the generated maintenance list.

6. The device maintainer according to claim 5, wherein the generated maintenance list includes the plural maintenance items regarding the operation target.

7. The device maintainer according to claim 5, wherein the at least one processor is further configured to execute the instructions to:
acquire the maintenance information; and
generate the maintenance list based on the acquired maintenance information.

8. The device maintainer according to claim 7, wherein the generated maintenance list includes the plural maintenance items regarding the operation target.

9. The device maintainer according to claim 7, wherein the acquired maintenance information include the result of the executed maintenance.

10. The device maintainer according to claim 9, wherein the generated maintenance list includes the plural maintenance items regarding the operation target.

11. The device maintainer according to claim 1, wherein the at least one processor is further configured to execute the instructions to:
generate the maintenance list; and
display the generated maintenance list.

12. A device maintenance system comprising:
a device maintainer; and
an external device configured to be communicably connected with the device maintainer, wherein
the external device further comprises a list generator configured to generate a maintenance list,
the device maintainer comprises:
at least one memory storing instructions; and
at least one processor configured to execute the instructions to:
display a first screen including the maintenance list, the maintenance list listing a plurality of devices which are maintenance targets and a plurality of maintenance items for each of the plurality of devices, the first screen enabling designation of a device of an operation target;
display a second screen including an execution button for executing at least one maintenance item linked with the operation target selected in the first screen among the plurality of maintenance items linked with the selected operation target;
execute maintenance based on the at least one maintenance item linked with the selected operation target when the execution button is pressed in the second screen; and
when the at least one maintenance item linked with the selected operation target has ended, display the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

13. A device maintenance method comprising:
displaying a first screen including a maintenance list, the maintenance list listing a plurality of devices which are maintenance targets and a plurality of maintenance items for each of the plurality of devices, the first screen enabling designation of a device of an operation target;
displaying a second screen including an execution button for executing at least one maintenance item linked with the operation target selected in the first screen among the plurality of maintenance items linked with the selected operation target;
executing maintenance based on the at least one maintenance item linked with the selected operation target when the execution button is pressed in the second screen; and
when the at least one maintenance item linked with the selected operation target has ended, displaying the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

14. A programmed computer that causes to:
display a first screen including a maintenance list, the maintenance list listing a plurality of devices which are maintenance targets and a plurality of maintenance items for each of the plurality of devices, the first screen enabling designation of a device of an operation target;
display a second screen including an execution button for executing at least one maintenance item linked with the operation target selected in the first screen among the plurality of maintenance items linked with the selected operation target;
execute maintenance based on the at least one maintenance item linked with the selected operation target when the execution button is pressed in the second screen; and
when the at least one maintenance item linked with the selected operation target has ended, display the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

15. A non-transitory computer readable storage medium that stores a computer program for causing, when executed by a computer, the computer to perform:
displaying a first screen including a maintenance list, the maintenance list listing a plurality of devices which are maintenance targets and a plurality of maintenance items for each of the plurality of devices, the first screen enabling designation of a device of an operation target;

displaying a second screen including an execution button for executing at least one maintenance item linked with the operation target selected in the first screen among the plurality of maintenance items linked with the selected operation target;

executing maintenance based on the at least one maintenance item linked with the selected operation target when the execution button is pressed in the second screen; and when the at least one maintenance item linked with the selected operation target has ended, displaying the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

16. The device maintenance system according to claim 12, wherein
the maintenance list includes the plural maintenance items to be enabling designation.

17. The device maintainer according to claim 1, wherein
the at least one processor is further configured to execute the instructions to:
change the display mode of the maintenance item of which the maintenance operation has been executed by at least one of adding a strikethrough to characters of the maintenance item, changing a size of characters of the maintenance item, changing a color of characters of the maintenance item, changing a font of characters of the maintenance item, filling a background of characters of the maintenance item, erasing characters of the maintenance item, and adding characters indicating the maintenance item has been done.

18. The device maintainer according to claim 1, wherein
the at least one processor is further configured to execute the instructions to:
display the maintenance information on a maintenance information screen; and
display the maintenance list in a separate window, the separate window being displayed together with the maintenance information screen.

19. A device maintainer comprising:
at least one memory storing instructions; and
at least one processor configured to execute the instructions to:
display a first screen including a maintenance list, the maintenance list listing a plurality of devices which are maintenance targets and a plurality of maintenance items for each of the plurality of devices, the first screen enabling designation of a device of an operation target;
display a second screen including an execution button for executing at least one maintenance item linked with the operation target selected in the first screen among the plurality of maintenance items linked with the selected operation target;

execute maintenance based on the at least one maintenance item linked with the selected operation target when the execution button is pressed in the second screen; and when the at least one maintenance item linked with the selected operation target has ended, display the first screen including an updated maintenance list including a first maintenance item of which a maintenance operation has not yet been executed and a second maintenance item of which a maintenance operation has been executed, the first maintenance item and the second maintenance item being displayed linked with the selected operation target, the second maintenance item being displayed to indicate that the second maintenance item has been done on the updated maintenance list for notifying to a field operator that the second maintenance item has been done.

20. The device maintainer according to claim 19,
wherein
the maintenance list includes a first operation target in which plural maintenance items for a device link to an ID as an execution unit of maintenance and a second operation target in which a maintenance item for plural devices links to an ID as an execution unit of maintenance,
the at least one processor is further configured to execute the instructions to:
receive an input designating at least one of the first operation target and the second operation target;
in a case where receiving the input designating the first operation target, perform the maintenance based on the plural maintenance items for the device, and
in a case where receiving the input designating the second operation target, perform the maintenance based on the maintenance item for the plural devices,
wherein
the at least one processor is further configured to execute the instructions to:
receive an input of the at least one of the first operation target and the second operation target; and
generate the maintenance list including the at least one of the first operation target and the second operation target input.

21. The device maintainer according to claim 19, wherein
the at least one processor is further configured to execute the instructions to:
display a setting screen for setting whether a linking between the plurality of devices which are maintenance targets and at least one maintenance item for each of the plurality of devices is performed automatically or manually;
display a fourth screen enabling designation of at least one maintenance item to be linked with the operation target among the plurality of maintenance items linked with the operation target selected in the first screen and included in the maintenance list in a case where it is set in the setting screen that the linking is performed manually, the fourth screen being not displayed in a case where it is set in the setting screen that the linking is performed automatically; and
display the second screen including an execution button for executing the at least one maintenance item manually linked with the operation target in the fourth screen or an execution button for executing the at least one maintenance item automatically linked with the operation target.

22. The device maintainer according to claim 19, further comprising:
    a maintenance information storage storing a result of the maintenance based on the at least one maintenance item linked with the selected operation target,
wherein
    the at least one processor is configured to execute the instructions to display the first screen including the updated maintenance list based on the result of the maintenance stored in the maintenance information storage, the second maintenance item being displayed to indicate that the second maintenance item has been done on the updated maintenance list.

* * * * *